United States Patent
Smith et al.

[19]

[11] Patent Number: 6,132,021
[45] Date of Patent: Oct. 17, 2000

[54] DYNAMIC ADJUSTMENT OF UNDER AND OVER PRINTING LEVELS IN A PRINTER

[75] Inventors: Brooke E. Smith, Brush Prairie, Wash.; Mark L. Choy, Escondido, Calif.

[73] Assignee: Hewlett-Packard Company, Palo Alto, Calif.

[21] Appl. No.: 09/329,974

[22] Filed: Jun. 10, 1999

[51] Int. Cl.[7] .................................................. B41J 29/38
[52] U.S. Cl. ................................ 347/6; 347/101; 347/19
[58] Field of Search ............................ 347/6, 7, 14, 17, 347/19, 101

[56] References Cited

U.S. PATENT DOCUMENTS

| | | | |
|---|---|---|---|
| 4,215,353 | 7/1980 | Kaieda et al. | 347/55 |
| 4,413,275 | 11/1983 | Horiuchi et al. | 358/75 |
| 4,682,190 | 7/1987 | Ikeda | 346/154 |
| 4,683,492 | 7/1987 | Sugiura et al. | 358/80 |
| 4,831,409 | 5/1989 | Tatara et al. | 364/526 |
| 4,953,013 | 8/1990 | Tsuji et al. | 358/75 |
| 4,953,015 | 8/1990 | Hayasaki et al. | 358/79 |
| 5,057,852 | 10/1991 | Formica et al. | 346/1.1 |
| 5,153,617 | 10/1992 | Salmon | 346/154 |
| 5,168,552 | 12/1992 | Vaughn et al. | 315/109 |
| 5,226,175 | 7/1993 | Deutsch et al. | 395/119 |
| 5,283,671 | 2/1994 | Stewart et al. | 358/532 |
| 5,313,291 | 5/1994 | Appel et al. | 358/501 |
| 5,473,446 | 12/1995 | Perumal, Jr. et al. | 358/523 |
| 5,561,454 | 10/1996 | Kurabayashi et al. | 347/105 |
| 5,633,662 | 5/1997 | Allen et al. | 347/19 |
| 5,638,101 | 6/1997 | Keefe et al. | 347/65 |
| 5,640,187 | 6/1997 | Kashiwazaki et al. | 347/101 |
| 5,648,806 | 7/1997 | Steinfield et al. | 347/87 |
| 5,680,519 | 10/1997 | Neff | 395/109 |
| 5,748,216 | 5/1998 | Scheffelin et al. | 347/87 |
| 5,784,090 | 7/1998 | Selensky et al. | 347/102 |
| 5,966,150 | 10/1999 | Lester et al. | 347/98 |
| 5,997,124 | 12/1999 | Capps et al. | 347/19 |
| 6,019,449 | 2/2000 | Bullock et al. | 347/14 |
| 6,042,208 | 3/2000 | Wen | 347/6 |

*Primary Examiner*—Eugene Eickholt

[57] ABSTRACT

The present invention provides a dynamic adjustment of the printed fluid volume for underprinting and/or overprinting pigment-based inks (or other inks) for speeding up the drying time of the pigment-based ink or improving its adherence to a medium. The invention identifies a characteristic in the printer that affects the optimum volume of under/overprinted fluid to be printed, such as pen temperature, operating frequency, operating life, ambient temperature, and ambient humidity, and varies the printed volume of the under/overprinted fluid accordingly.

29 Claims, 8 Drawing Sheets

DYNAMIC ADJUSTMENT OF UNDER AND OVER PRINTING LEVELS IN A PRINTER

BACKGROUND OF THE INVENTION

1. Field of the Invention

This invention relates to inkjet printers and, in particular, to a printing technique for reducing the dry time of ink or increasing the adherence of ink printed on a medium.

2. Background

U.S. patent application Ser. No. 09/273,703, entitled "Mixing Overprinting and Underprinting of Inks in an Inkjet Printer to Speed up the Dry Time of Black Ink Without Undesirable Hue Shifts," by Paul Gast et al. (including Brooke Smith as a co-inventor), was filed on Mar. 22, 1999. This prior application is incorporated herein by reference. This prior application describes underprinting a pigment-based black ink with a dye-based color ink for reasons including speeding up the dry time of the black ink. Overprinting the black ink with a different color ink was also described for avoiding hue shifts in bi-directional printing. Fixed amounts of the overprinted and underprinted inks were described. This technique works well; however, the present Applicants have discovered that, at a cost of additional complexity, the technique can be improved by dynamically selecting the amount of ink to be deposited for the overprinting and/or underprinting. This improvement is the subject matter of the present application.

A typical high quality color inkjet printer prints using at least four colors of ink: cyan, magenta, yellow, and black. A common black ink is a pigment-based ink where undissolved particles are suspended in a clear vehicle. Such pigment-based ink creates the darkest black with a minimum of bleed into the paper. Since the paper is typically white, any significant bleeding of the black ink into the paper will noticeably reduce the sharpness of the edges of black text or other black graphics.

For non-black color inks, dye-based inks are very popular. Dye-based inks do not have color particles suspended in solution and thus tend to bleed into the paper more than pigment-based inks. Since the dye-based ink wicks or bleeds into the paper, the dye-based inks dry faster than the pigment-based inks, which effectively pool on the paper surface. Non-black color inks may also be pigment-based.

Examples of such inks are described in U.S. Pat. Nos. 5,695,820 and 5,626,655 assigned to the present assignee and incorporated herein by reference.

Fixers are well known clear solutions that are sometimes printed under pigment-based, dye-based, or pigment/dye-based hybrid inks to help the inks bond to the paper. Fixers may also be used to minimize finger smudging of the ink, as well as for other benefits. One type of fixer is a cationic polymer. Fixers are described in U.S. Pat. Nos. 4,694,302 and 5,746,818, incorporated herein by reference. Such fixers are printed by a print cartridge (or pen) similar to those used to print the black and other color inks. Fixers are optional in the present invention.

As inkjet printers evolve to print faster, there is less time for the ink to dry. In some cases, after printing on a page is complete, the printer needs to hold onto the page for a predetermined time in order to let the ink dry before depositing the page in an output tray. The drying of the pigment-based black ink is likely to be the bottleneck for drying time of a page.

The prior application, describing using a fixed volume of underprinting ink, solves the problem of drying time of the black ink by first wetting the paper with a dye-based ink followed by printing with the black ink over the wetted paper. The paper wicks the clear vehicle for the black pigment to hasten the black ink's drying time. In this example, such underprinted fluid acts as a surfactant. In another embodiment, the fixer or dye-based ink used to underprint a pigment-based ink reacts with the black ink to precipitate out the black pigment and quickly solidify the pigment. These underprinted fluids are referred to as reactants. Reactants also serve to prevent bleeding of the black ink into any adjacent color ink patterns. The underprinted fluid can have characteristics of both reactants and surfactants.

There is an optimum volumetric relationship between the "image" ink and the underprinting (or overprinting) ink or fixer. It is difficult to provide a fixed amount of ink per ink drop since the drop weight varies as a function of pen temperature, pen firing frequency, and pen life. Thus, ideally, the amount of underprinting (or overprinting) fluid must track the changing drop weight of the image ink. Further, the optimum underprinting (or overprinting) level is affected by the media characteristics, which are a function of ambient air temperature and relative humidity.

What is needed is a technique that provides a more optimum amount of underprinting (or overprinting) fluid as characteristics within the printer change.

SUMMARY

The present invention provides a dynamic adjustment of the fluid volume used for underprinting and/or overprinting pigment-based inks (or other inks) for speeding up the drying time of the pigment-based ink or improving its adherence to a medium. The invention identifies a characteristic in the printer that affects the optimum volume of under/overprinted fluid to be printed, such as pen temperature, pen operating frequency, pen operating life, ambient temperature, and ambient humidity, and varies the under/overprinted fluid accordingly.

In the following examples, it will be assumed that the black ink is pigment-based, and it is desired to underprint the black ink with either a dye-based color ink or a fixer. The ink drop weight increases as the printhead is heated. At least two different techniques can be used to adjust the volume of the under/overprinted fluid based upon the temperature of the black printhead to maintain a constant volumetric relationship between the black ink and the under/overprinted fluid. The first technique relies upon the fact that more dense printing causes the black printhead temperature to rise. Using this approach, a raster based look ahead algorithm identifies large blackout (solid fill) or high ink flux areas. Then, using an algorithm or lookup table, the print engine can be controlled to adjust the underprinting color ink or fixer levels to compensate for the larger drop weights of the hotter black pen.

Fixer print cartridges are similar to the color and black print cartridges and may be located at the extreme ends of the carriage, if all the inks use fixers, or on either side of a black print cartridge if only the black ink uses a fixer. Other fixer pen locations may be used to optimize black or other color ink throughput.

A more direct approach for adjusting the underprinting color ink or fixer level to compensate for the varying temperature of the black printhead is to modulate the color ink or fixer level by monitoring the black pen printhead temperature using a temperature sensor formed in the printhead substrate. A lookup table or algorithm is used to define an incremental range of color ink or fixer level to compensate for the larger drop weights of the hotter black printhead.

The ink drop weight also varies with the operating frequency of the printhead. To dynamically adjust the color ink or fixer level over the black pen's firing frequency range, a correction lookup table or algorithm is provided a value corresponding to the operating frequency. The lookup table or algorithm then provides a value which is used to control the printed volume of the under or overprinted ink.

Similar techniques are also used to vary the printed volume of the underprinted or overprinted inks or fixers over the life of the various printheads or to vary the printed volume in response to the changing media characteristics due to ambient air temperature and relative humidity.

Although underprinting black ink was used as an example, the technique is also applicable for underprinting or overprinting any color ink, whether pigment-based or dye-based or a hybrid.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
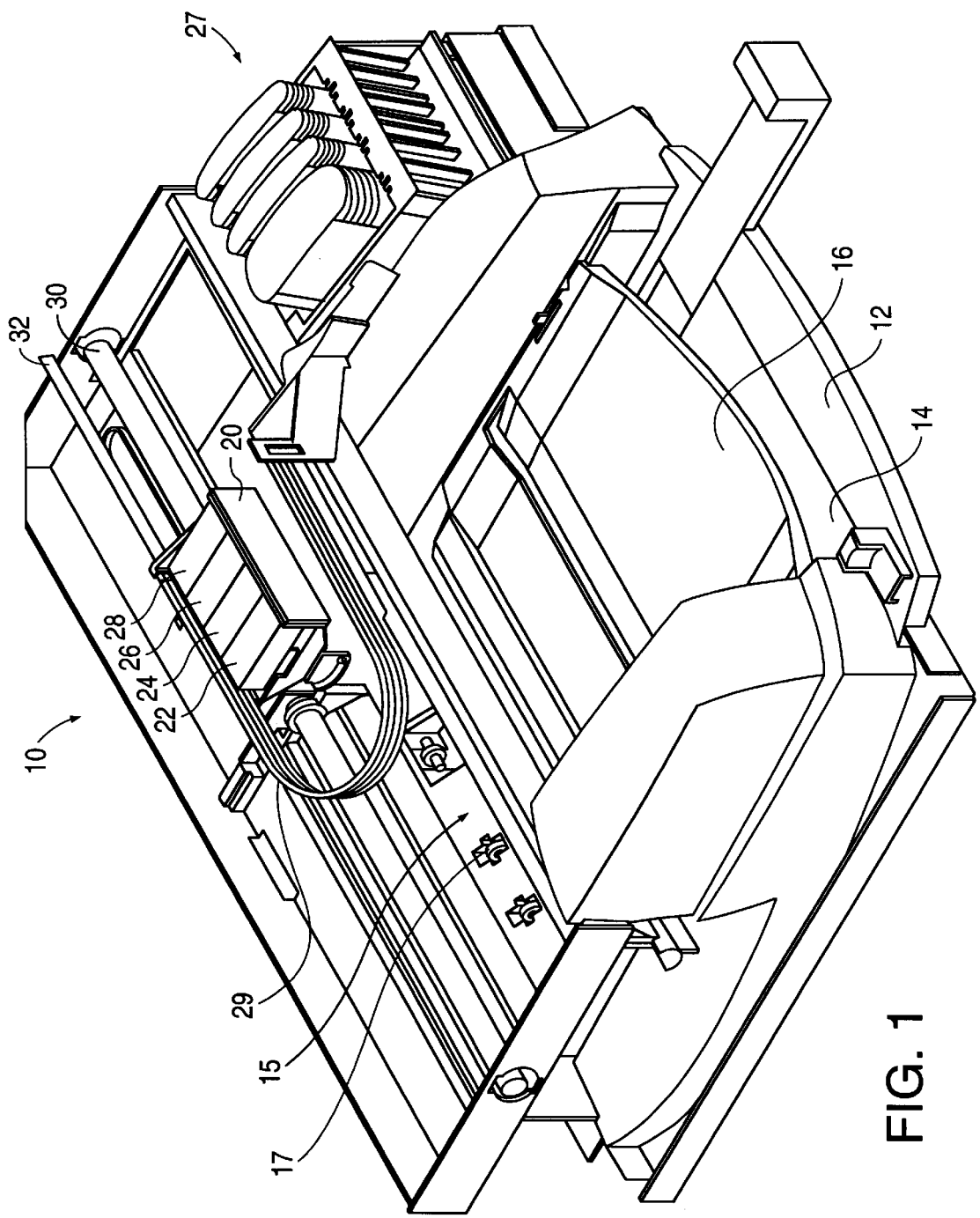
FIG. 1 illustrates one of many examples of an inkjet printer that incorporates the present invention.

FIG. 1 illustrates one embodiment of an inkjet printer 10 that carries out the invention. Numerous other designs of inkjet printers may also be used while carrying out this invention. More detail of an inkjet printer is found in U.S. Pat. No. 5,852,459, to Norman Pawlowski et al., incorporated herein by reference.

Inkjet printer 10 includes an input tray 12 containing sheets of paper 14 which are forwarded through a print zone 15, using rollers 17, for being printed upon. The paper 14 is then forwarded to an output tray 16. A moveable carriage 20 holds print cartridges 22, 24, 26, and 28, which respectively print cyan (C), black (K), magenta (M), and yellow (Y).

In another embodiment, a fixer print cartridge is located at both ends of the carriage so a fixer can be underprinted or overprinted in both directions. In such an embodiment, all the inks are generally pigment-based or pigment/dye hybrids but can be dye-based.

In one embodiment, inks or fixers in replaceable ink cartridges 27 are supplied to their associated print cartridges via flexible ink tubes 29. The print cartridges may also be the type that hold a substantial supply of fluid and may be refillable or non-refillable. In another embodiment, the ink/fixer supplies are separate from the printhead portions and are removeably mounted on the printheads in the carriage.

The carriage 20 is moved along a scan axis by a conventional belt and pulley system and slides along a slide rod 30. In another embodiment, the carriage is stationery, and an array of stationary print cartridges print on a moving sheet of paper.

Printing signals from a conventional external computer (e.g., a PC) are processed by printer 10 to generate a bitmap of the dots to be printed. The bitmap is then converted into firing signals for the printheads. The position of the carriage 20 as it traverses back and forth along the scan axis while printing is determined from an optical encoder strip 32, detected by a photoelectric element on carriage 20, to cause the various ink ejection elements on each print cartridge to be selectively fired at the appropriate time during a carriage scan.

Figure 2:
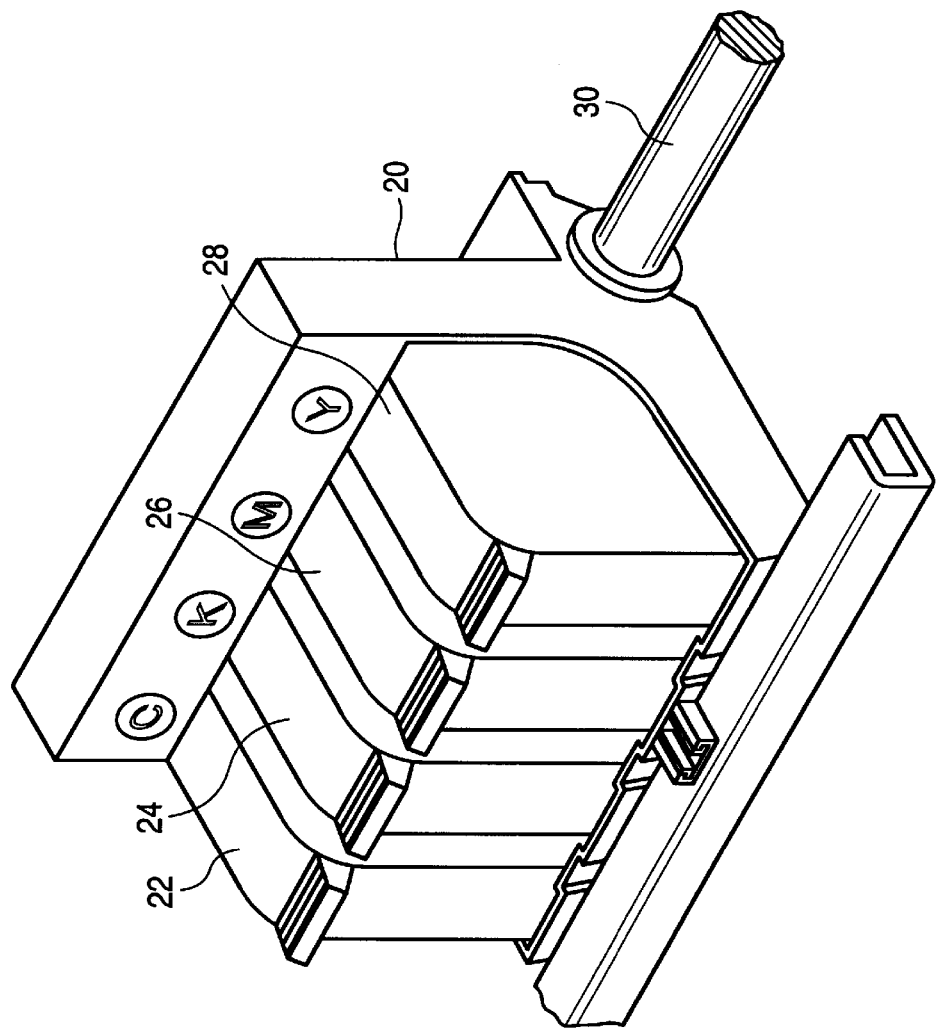
FIG. 2 illustrates the scanning carriage in the printer of FIG. 1 and one possible order of print cartridges in the carriage.

FIG. 2 illustrates one example of carriage 20 with print cartridges 22, 24, 26, and 28 installed in the order of CKMY, as viewed from the front of printer 10. Other orders and colors may also be used.

Figure 3:
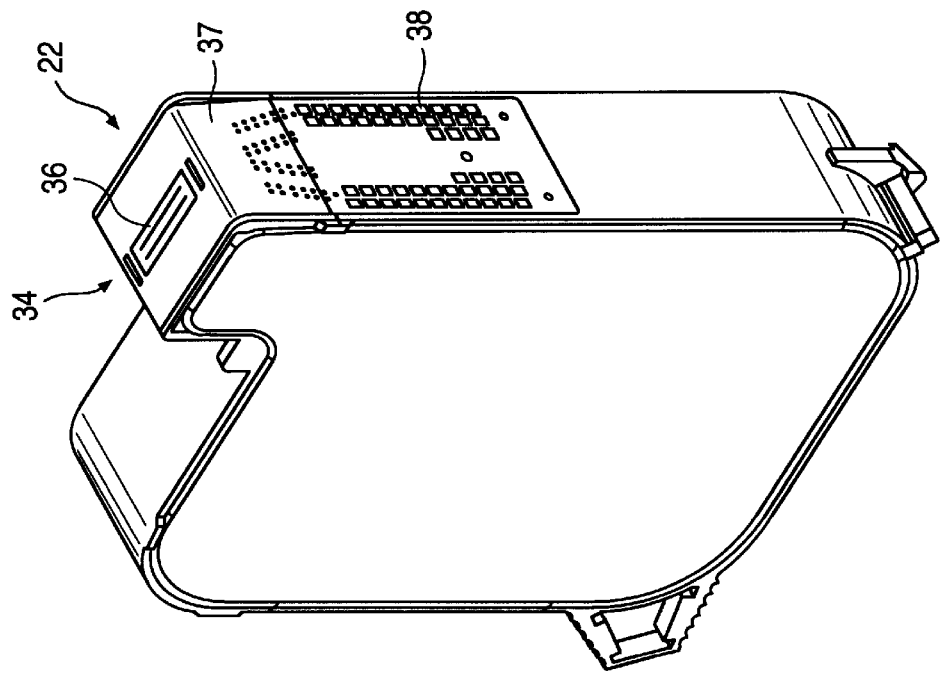
FIG. 3 is a perspective view of one of the print cartridges.

FIG. 3 is a perspective view of a print cartridge which may serve as any of the print cartridges in carriage 20, such as print cartridge 22. Print cartridge 22 contains a reservoir of ink, or has an ink passage connected to an off-axis ink supply, which is connected to a printhead portion 34. The printhead portion 34 basically consists of a printhead substrate containing ink channels leading to chambers surrounding ink ejection elements. A nozzle plate 36 is positioned over the substrate with each nozzle overlying an ink ejection chamber. In one embodiment, nozzles are formed in a flexible tape (a TAB circuit 37). Contact pads 38 contact electrodes in carriage 20 and supply electrical signals to the printhead substrate via traces on the TAB circuit 37. In another embodiment, nozzle plate 36 is an epoxy or metal.

The printhead may use resistive, piezoelectric, or other types of ink ejection elements.

As the print cartridges in carriage 20 in FIG. 2 scan across a sheet of paper, the swaths printed by the print cartridges overlap. After one or more scans, the sheet of paper 14 is shifted in a direction towards the output tray 16 (FIG. 1), and the carriage 20 resumes scanning. It is important that the same color swaths printed during each scan not significantly vary in hue, otherwise noticeable banding results.

As previously explained, in the prior art, the drying time for black ink (or other pigment based inks) is typically longer than the drying time for the non-black color inks, if dye-based, due to the different types of inks used. Black ink is preferably pigment-based (although it may be dye-based) while primary color inks are dye-based, pigment-based, or pigment/dye-based. Since the black ink is specifically engineered not to bleed into the paper, the black ink typically has a longer drying time than the color inks. Thus, the black ink drying time frequently becomes the bottleneck for the drying time of a sheet of paper. The pigment-based ink drying time may be reduced, and adherence to the paper improved, by using clear underprinted fixers. Alternatively, as described in the previous application, printing a color dye-based ink under the black pigment-based ink reduces dry time to decrease page to page blotting, decreases finger smudge, and decreases paper hold times. The color ink or fixer underprint should optimally have a constant volumetric relationship to the image ink that is printed directly over the color ink or fixer.

Overprinting is also used to decrease finger smudge, and an optimal volumetric relationship also exists between the image ink and the overprinting fluid.

Pen drop volumes are decreasing to improve print quality and image quality. As pen drop volume is decreased, thermal efficiency decreases (less heat is removed by each ejected ink drop) with a corresponding increase in pen operating temperature. Pen drop weights roughly increase from 0.5 percent to 1 percent per degree C. Pen temperature can jump 40° C. within a single swath when printing blackout areas. This is a 40 percent increase in drop volume. Due to the varying drop volume of the pigment-based ink, the fixed volume of the ink or fixer used to underprint the pigment-based ink will not be optimal as the temperatures of the different printheads vary.

The drop volume also varies due to pen firing frequencies and the operating life of the pen. Further, the characteristics of the media also dictate the optimum volume of ink or fixer to be underprinted. The characteristics of the media are affected by relative humidity and ambient air temperature.

Figure 4:
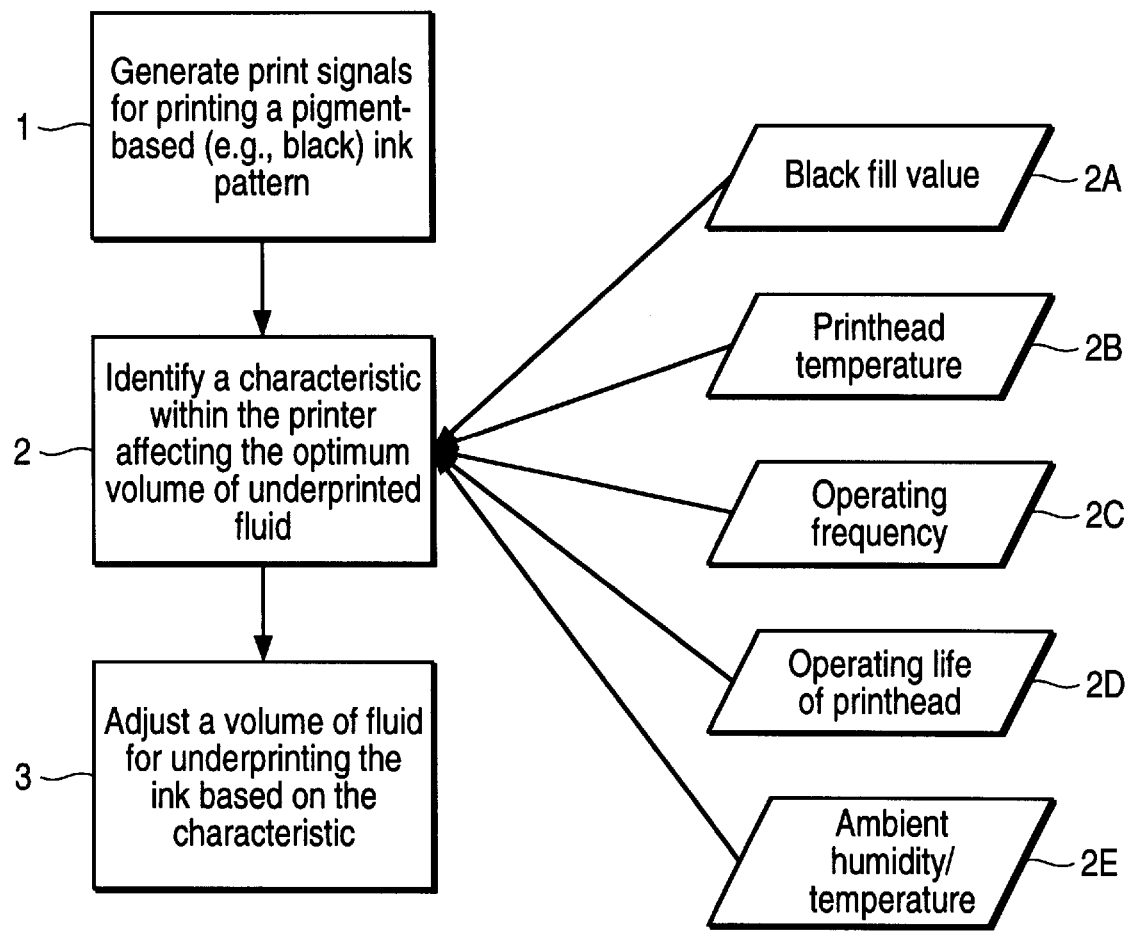
FIG. 4 is a flowchart illustrating the basic steps used in one embodiment of the invention.

Described below are various techniques for adjusting the volume of the ink or fixer to underprint a pigment-based ink or any other ink that uses underprinting. This same technique is used for adjusting overprinting volume. FIG. 4 is a flowchart of the basic technique used in the invention.

In Step 1, print signals are generated for printing a first ink pattern for which underprinting is desirable. This first ink may, as an example, be a black or other color pigment-based ink, and the underprinted ink may be either a dye-based ink or a fixer.

In Step 2, a characteristic within the printer that affects the optimum volume of the underprinted ink/fixer is determined. Such characteristics may be obtained from: an algorithm for detecting high density fills or high ink fluxes (Step 2A); a thermal sensor embedded in a printhead substrate (Step 2B); a signal identifying the operating frequency of the printhead (Step 2C); a signal indicating the operating life of the printhead (Step 2D); or an ambient temperature/humidity sensor for indicating the characteristics of the media (Step 2E). Any one or any combination of these characteristics may be used in Step 2.

In Step 3, the characteristics identified in Step 2 are used to adjust the volume of fluid (either an underprinted color ink or a fixer) for underprinting the first ink. In one embodiment, adjusting the volume of the fluid in Step 3 is accomplished by depositing more or less ink drops of the fluid. In another embodiment, the pulsewidths of the pulses applied to the ink ejection elements, such as resistors or piezoelectric elements, are adjusted to eject more or less ink from an ink chamber.

Figure 5:
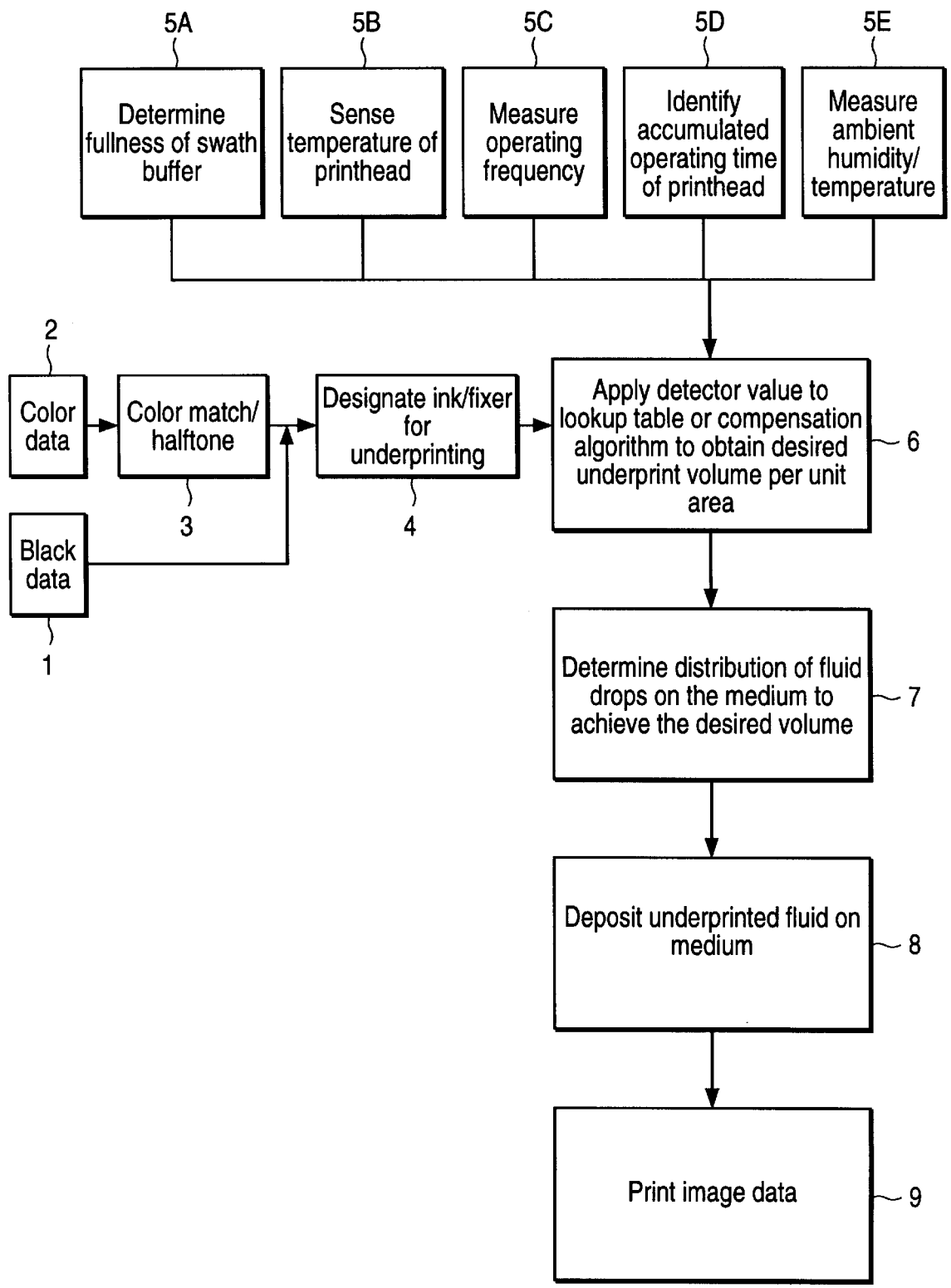
FIG. 5 is a flowchart illustrating in greater detail the steps of dynamically adjusting the volume of the under/overprinted fluid.

FIG. 5 is a flowchart showing in more detail the process of FIG. 4 for adjusting the volume of a fluid underprinting a pigment-based ink, such as black ink, or any other ink for which underprinting is desired.

In Steps 1 and 2 of FIG. 5, black and non-black color data are generated for being reproduced by a color printer. In Step 3, the color data is matched to a color reproduceable by the printer, and arrangements of ink dots (halftoning) are determined for reproducing the desired color with the specific inks used by the printer.

In Step 4, the underprinting and/or overprinting by certain ink(s) or a fixer is determined. In one embodiment, the under/overprinting of black ink is by a mixture of cyan and magenta inks. If two fixer print cartridges are used, Step 4 identifies the contribution by each of the fixer cartridges. In one embodiment, Step 4 identifies a nominal volume of the under/overprinting ink, and a later step varies this nominal volume based on the printer characteristics.

Steps 5A–5E generate signals from detectors for indicating certain characteristics of the printer. Step 5A of FIG. 5 uses a raster-based algorithm to determine beforehand the amount of black ink to be deposited in one or more swaths. The amount (or ink density) of black ink to be deposited determines the temperature of the black printhead. By knowing the temperature of the black printhead, the black ink drop size is also known. One technique for detecting the amount of black ink to be deposited is to determine the fullness of the swath buffer and assign the fullness an index value. One way to determine the fullness of the swath buffer is to detect digital flags generated when fullness threshold values are exceeded in the swath buffer. Generating flags is common in buffered systems. Swath buffers are conventional and discussed in U.S. Pat. No. 5,805,174, entitled Display List Architecture Having Two Dimensional Array of Zones, by Padmanabhan Ramchandran, assigned to the present assignee and incorporated herein by reference. A swath buffer may store from one swath to a full page.

In Step 6 of FIG. 5, the value generated in Step 5A, for example, is applied to a lookup table which associates the value to a fluid volume per unit area required for the underprinted ink or fixer. In another embodiment, the fullness value is used by a compensation algorithm to develop the desired fluid volume per unit area for underprinting. The lookup table or algorithm also takes into account the anticipated increased temperature of the underprinting printhead. In one embodiment, where Step 4 identifies a nominal volume of the under/overprinting ink, Step 6 provides an adjustment of the nominal volume based on the printer characteristics.

In Step 7 of FIG. 5, the determination of firing an ink ejection element to deposit a dot or not deposit a dot in a certain pixel position is made in order to achieve the desired fluid volume per unit area for the underprinting. In one embodiment, the desired volume of fluid is printed by varying the dot density along the scan axis of the printer. Steps 6 and 7 may be combined, in one embodiment, if the table or algorithm in Step 6 directly identifies the number of under/overprinted dots for each image dot.

In Step 8 of FIG. 5, the printhead for the underprinting fluid is energized to deposit ink or fixer drops in accordance with Step 7. By dynamically selecting this fluid volume, a more optimal underprinted fluid volume is achieved.

In Step 9 of FIG. 5, the image ink(s) for reproducing the data in Steps 1 and 2 is printed. This may be followed by an overprinting step to fix the ink or to prevent hue shifts.

Steps 5B through 5E of FIG. 5 provide other printer characteristics that are applied to suitable lookup tables or algorithms to adjust the underprinting fluid volume. Steps 5A through 5E may be employed individually or in any combination. Step 5B detects the actual temperature of the black (or other color) printhead using any conventional thermal sensor. A thermal sensor could be incorporated directly into the printhead, such as into the printhead described in U.S. Pat. No. 5,648,806, entitled "Stable Substrate Structure for a Wide Swath Nozzle Array in a High Resolution Inkjet Printer," assigned to the present assignee and incorporated herein by reference.

Figure 6:
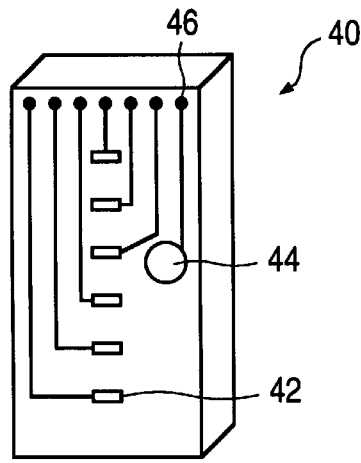
FIG. 6 is a perspective view of a portion of a printhead illustrating a temperature sensor on the printhead.

FIG. 6 is a perspective view of a printhead substrate 40, typically formed of silicon, with heater resistors 42 formed on it for use as ink ejection elements. Also formed on substrate 40 is a thermal sensor 44, which can simply be a PN junction whose conductivity is related to the temperature of the substrate 40. Any other thermal sensor may be used. Thermal sensor 44 is connected to one of the various electrodes 46 along the edges of substrate 40 which connect to contact pads on the print cartridge. These contact pads on the print cartridge are then coupled to various circuits in the printer itself for controlling the printhead and for receiving the thermal readings from the sensor 44.

The temperature value is digitized and applied to either a lookup table (Step 6 of FIG. 5) or used in a compensation algorithm to ultimately control the density of underprinted ink drops so that the fluid volume per unit area meets the desired volume, as discussed previously with respect to Steps 6, 7, and 8 in FIG. 5.

Figure 7:
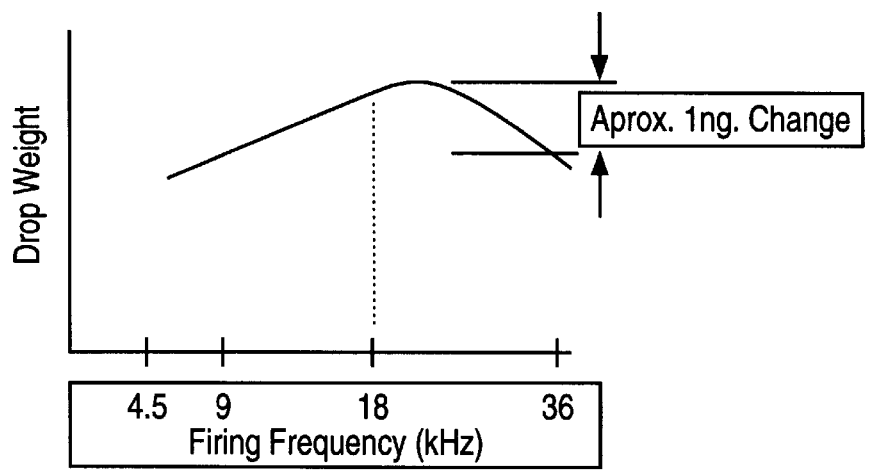
FIG. 7 illustrates the effect of firing frequency on ink drop weight.

Ink drop volume is affected by the ink drop firing rate due to the fluid mechanics of the ink flowing in the printhead. The graph of FIG. 7 illustrates the variation in drop weight versus firing frequency, with the drop weight changing by as much as 25% over the range of firing frequencies.

Step 5C of FIG. 5 detects the firing rate of the black (or other ink to be underprinted) printhead. Such a detector may include one or more counters for counting the pulses applied to the printhead over a period of time. The frequency value is applied to a lookup table or a compensation algorithm to ultimately control the density of fluid drops used to underprint a particular ink, as described with respect to Steps 6–8 in FIG. 5.

The drop weight generally increases over the life of the pen due to wear on the pen. Step 5D of FIG. 5 generates a value corresponding to the accumulated operating time of the pen. This determination may, for example, be based upon the number of drops fired or based upon the total time of use of the pen. Such a value is applied to a lookup table or a compensation algorithm, as previously described, to control the amount of underprinted fluid.

The optimum volume of underprinted fluid is also determined by the characteristics of the medium. These characteristics are affected by the ambient relative humidity and ambient temperature. A conventional humidity detector is located within the printer, and its value is converted to an index for a lookup table or for use by a compensation algorithm, as previously described. The output of the lookup table or algorithm is then used to ultimately control the density of the underprinted ink droplets. Ambient temperature may also be used and the combination of humidity and temperature converted into a value for use by the lookup table or algorithm.

In the low relative humidity range (10% R.H.), the paper moisture content is low. More underprinting of fixer or color ink is required to pre-treat the page before the black or other color ink contacts the paper. With a humidity sensor, levels could be preset based on several humidity ranges using the lookup table or compensation algorithm. In a hot and wet condition, (e.g., 35° C., 80% R.H.), text print quality is compromised by the high moisture content in the paper, causing poor edge acuity (feathering). By using temperature and humidity measurements, the underprinting level can be decreased or increased to optimize print quality.

The techniques used in FIG. 5 may be used to underprint, overprint, or interleave dots.

Figure 8:
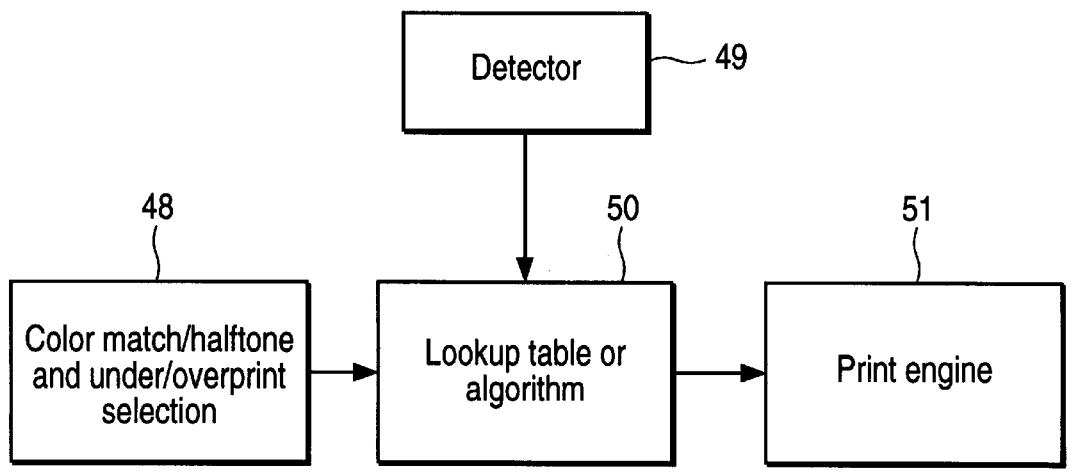
FIG. 8 illustrates one embodiment of the hardware used to carry out the process of FIG. 5.

FIG. 8 illustrates a circuit that can be used for the various techniques described herein. One or more lookup tables or algorithms 48 perform color matching, halftoning, and the selection of the under/overprinting fluid. Detector 49 obtains characteristics about the printer affecting underprinting and/or overprinting. Detector 49 generates a digital value which is used as an index for a lookup table or in a compensation algorithm 50, which then generates a value indicating the fluid volume per unit area to be printed. This value may identify the number of under/overprinted dots to be printed for a particular image dot. The print engine 51 then prints the actual dots on a medium, as described in FIGS. 9 and 10.

Figure 9A:
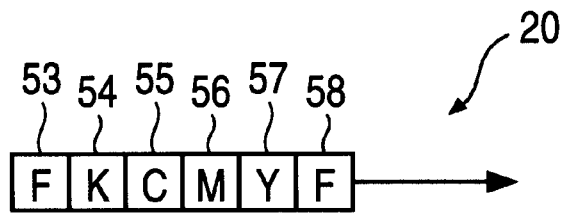
FIGS. 9A through 9F illustrate the printing of a text character using bi-directional scanning and fixer pens.
Figure 9B:
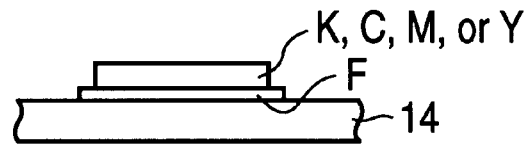
Figure 9C:
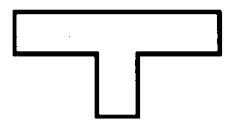

FIGS. 9A–9F illustrate the underprinting of black ink by a fixer in a bi-directional print mode. In FIG. 9A, a scanning carriage 20 incorporating six print cartridges 53–58, with a fixer print cartridge at both ends, is shown scanning from left to right. It is assumed that the letter "T" will be printed in two passes using black ink. In the first pass from left to right, the fixer fluid from print cartridge 58 is deposited and, in the same scan, the black ink from print cartridge 54 is deposited over the fixer, as shown in FIG. 9B, illustrating a cross-section of a sheet of paper 14 with the fixer and black ink printed thereon. Any other color can be underprinted by the fixer. FIG. 9C is a front view of the portion of the T printed on paper 14. The volume of the fixer deposited is determined using any of the methods described in FIG. 5. Interleaving of fixer dots is possible with multipass print modes, or the trailing fixer pen and leading fixer pen can interleave dots in a FKCMYF configuration, as an example.

Figure 9D:
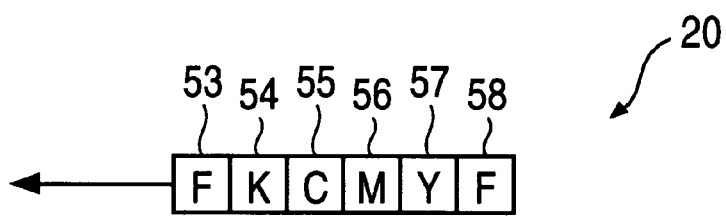
Figure 9E:
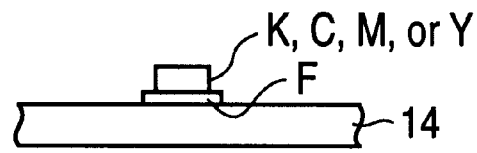
Figure 9F:
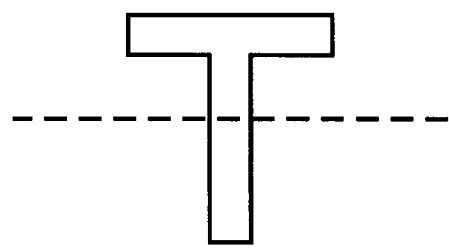

In the scan from right to left, shown in FIG. 9D, the fixer fluid from print cartridge 53 is first printed on paper 14 followed by ink from the black ink cartridge 54, as shown in FIG. 9E, to complete the letter T in FIG. 9F.

In one embodiment, the black print cartridge 54 prints at a resolution of 600 dots per inch (dpi) along the paper shift axis, and prints at up to 3600 dpi along the scan axis. The fixer and other color print cartridges can print at the same resolution of the black print cartridge or less, such as 300 dpi. In one embodiment, the volume of the underprinted ink or fixer is about 25% of the volume of the black ink to be deposited. However, the relative volume is to be based on the particular inks and fixers used and, therefore, an optimal amount cannot be specified herein. The volume of the underprinted ink or fixer may range, for example, between 5 to 50% of the black ink volume. The resolution along the scan axis may be varied to achieve the desired volume of under/overprinted fluid for each image dot printed.

Figure 10A:
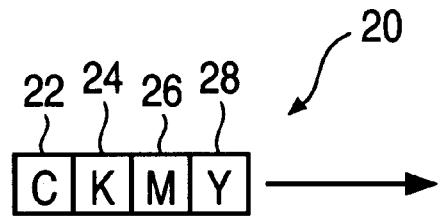
FIGS. 10A through 10F illustrate another embodiment of the printing of a text character usihg bi-directional scanning without fixer pens.
Figure 10B:
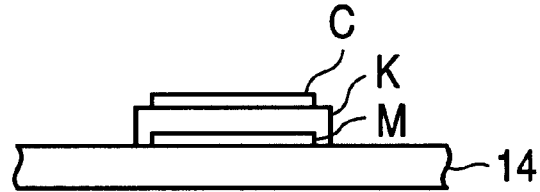
Figure 10C:

FIGS. 10A–10F are similar to FIGS. 9A–9F except that the dye-based CMY inks incorporated in the printer of FIG. 1 are used to underprint and overprint the black pigment-based ink. FIG. 10A illustrates the print cartridges in carriage 20 scanning from left to right. FIG. 10B illustrates the order of the underprinted and overprinted inks printed from left to right, which are, in this example, magenta and cyan sandwiching the black ink. FIG. 10C illustrates the portion of the letter T printed in the scan from left to right.

Figure 10D:
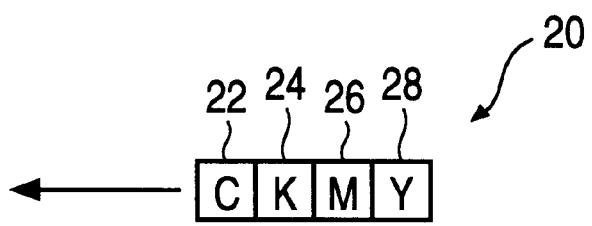
Figure 10E:
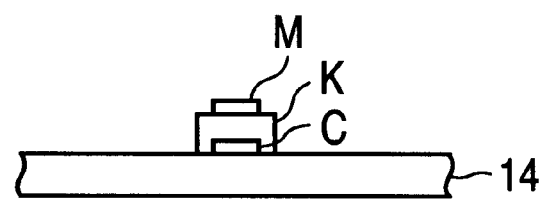
Figure 10F:
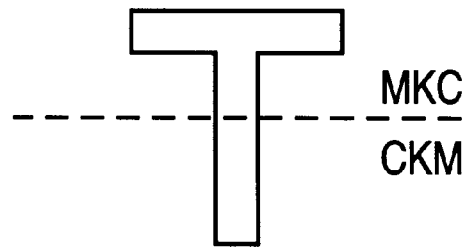

FIG. 10D illustrates the carriage 20 scanning from right to left. FIG. 10E illustrates the order of the underprinted and overprinted inks being now cyan and magenta sandwiching the black ink, and FIG. 10F illustrates the full letter T printed in two scans. As with the fixer fluid in FIGS. 9A–9F, the underprinted and overprinted inks in FIGS. 10A–10F have their volumes dynamically adjusted based upon the previously discussed parameters affecting the drop volume of the black ink on the medium.

In one example, the volume of each color ink drop or fixer may be eight picoliters or less, and the volume of each black ink drop may be about 32 picoliters or less. If a single color or fixer dot was printed for each black dot, the volume of the underprinted fluid would be around 25% of the volume of a black ink. In those cases where a lower volume of an underprinted fluid is needed, various pixel positions may have no color or fixer dots printed. In those cases where a higher volume of color ink or fixer is needed, various pixel positions may have multiple fluid dots printed so that the desired average volume is met. Scan axis resolution can be higher than nozzle pitch resolution (e.g., 600×1200, 600×2400), so achieving the desired volume may be by varying the scan axis resolution. By dynamically selecting this fluid volume, as described in FIG. 5, a more optimal underprinted fluid volume will be achieved.

Figure 11:
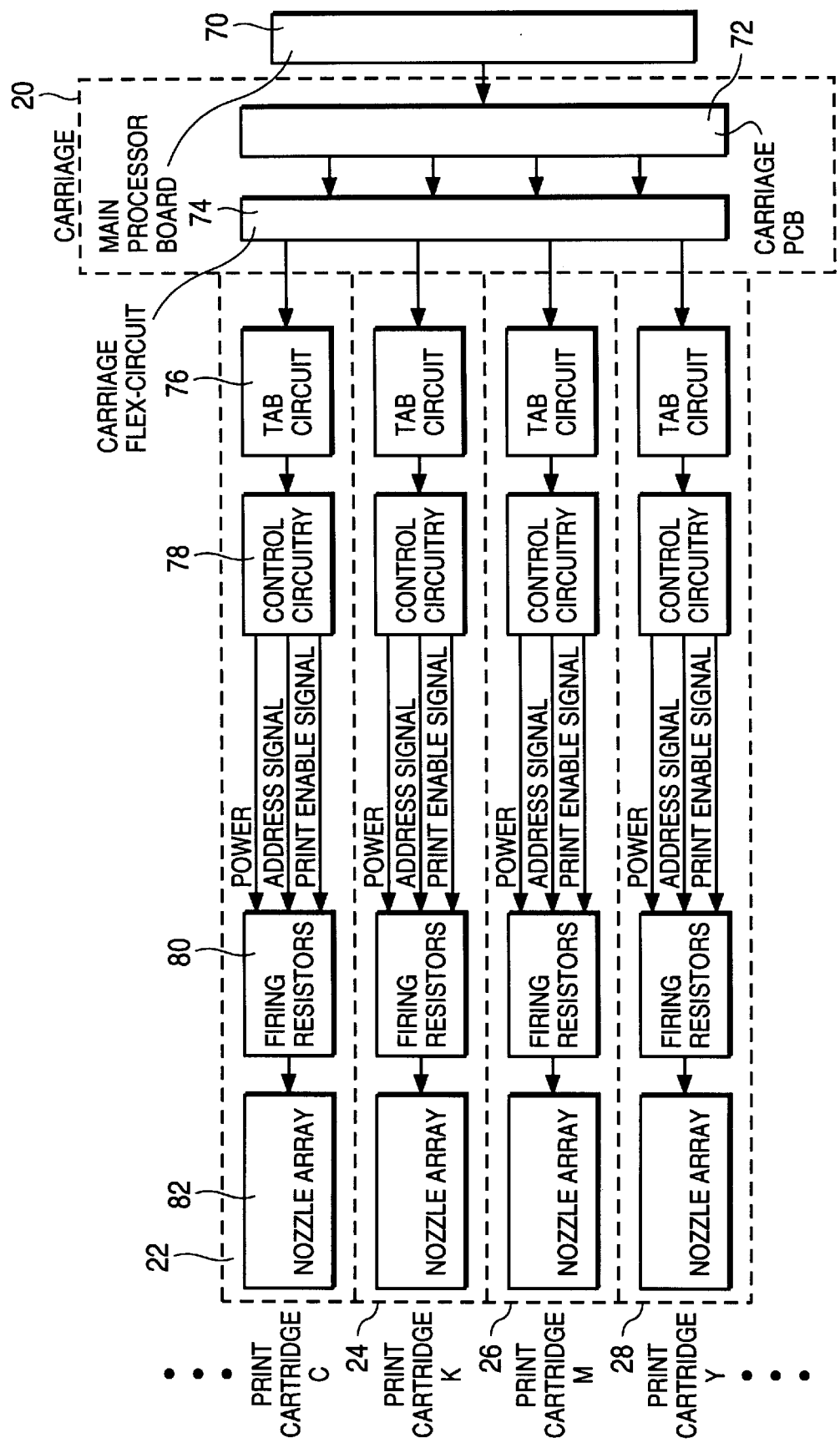
FIG. 11 illustrates the electronics within the printer for generating the energization signals for the fluid ejection elements in the printheads.

FIG. 11 illustrates the basic circuitry in the print cartridges, carriage 20, and printer 10 for generating the firing signals for the heater resistors in the printheads. The main processor board 70 in the printer performs the well known steps of decoding the print signals from the personal computer connected to an input of the printer and creating a bitmap of the dots to be printed in a swath buffer forming part of the main processor board 70. Additional details of one technique for creating the bitmap of the dots is found in U.S. Pat. No. 5,805,174, entitled Display List Architecture Having Two Dimensional Array of Zones, by Padmanabhan Ramchandran, assigned to the present assignee and incorporated herein by reference. The data is transferred to the carriage printed circuit board 72, which uses timing signals from the optical encoder strip 32 (FIG. 1) to generate the addressing signals for firing selected heater resistors in a particular printhead. A carriage flex circuit 74 contains electrodes for being contacted by the contact pads on the print cartridge TAB circuit 76. A control circuit 78 on the printhead distributes the signals to the various heater resistor circuits. The heater (or firing) resistors 80 vaporize a portion of the ink in their associated chambers to expel a droplet of ink through an associated nozzle in a nozzle array 82. The carriage may also include fixer cartridges or other color cartridges.

The above description has focused on single pass type printers where the paper is shifted a swath width after a single pass. However, the underprinting and overprinting can also be used in a multiple pass mode of printing where swaths in two consecutive scans either fully or partially overlap. In such a multipass printer, the black printhead (or set of nozzles) need not have other color printheads (or sets of nozzles) on both sides of it since the overprinting and underprinting can be done in two separate passes.

The present invention is equally applicable to alternative printing systems (not shown) that utilize alternative media and/or printhead moving mechanisms, such as those incorporating grit wheel, roll feed, or drum or vacuum belt technology to support and move the print media relative to the printhead assemblies. With a grit wheel design, a grit wheel and pinch roller move the media back and forth along one axis while a carriage carrying one or more printhead assemblies scans past the media along an orthogonal axis. With a drum printer design, the media is mounted to a rotating drum that is rotated along one axis while a carriage carrying one or more printhead assemblies scans past the media along an orthogonal axis. In either the drum or grit wheel designs, the scanning is typically not done in a back and forth manner as is the case for the system depicted in FIG. 1.

Multiple printheads may be formed on a single substrate. Further, an array of printheads may extend across the entire width of a page so that no scanning of the printheads is needed; only the paper is shifted perpendicular to the array.

Heating of the paper by a heat source may be used in conjunction with the invention for speeding up dry time.

Additional print cartridges in the carriage may include orange, green, red, blue, or reduced dye/pigment level inks such as light cyan, light magenta, or light yellow.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by an inkjet printer, said printer moving one or more printheads relative to a medium while said printheads are printing on said medium, said printheads including a first set of nozzles for printing dots of a first ink, and a second set of nozzles for printing dots of a second fluid, said second fluid for interacting with said first ink on said medium, said method comprising:
    (a) determining a characteristic within said printer for affecting a volumetric relationship between said first ink and said second fluid;
    (b) printing said second fluid so as to have a printed volume at least partially determined by said characteristic; and
    (c) printing said first ink to be in contact with said second fluid so as to interact with said second fluid, wherein a desired volumetric relationship between said first ink and said second fluid is achieved.

2. The method of claim 1 wherein said second fluid is a fixer.

3. The method of claim 1 wherein said second fluid is a dye-based ink.

4. The method of claim 1 wherein said first ink is a pigment-based ink.

5. The method of claim 1 wherein said first ink is selected from the group consisting of black ink, cyan ink, magenta ink, yellow ink, orange ink, green ink, red ink, blue ink, light cyan ink, light magenta ink, and light yellow ink.

6. The method of claim 1 wherein said first ink is printed over said second fluid.

7. The method of claim 1 wherein said first ink is interleaved with said second fluid.

8. The method of claim 1 wherein said second fluid is printed over said first ink.

9. The method of claim 1 wherein said second fluid speeds up a drying time of said first ink.

10. The method of claim 1 wherein said second fluid improves adherence of said first ink to said medium.

11. The method of claim 1 wherein said characteristic within said printer comprises a temperature of a printhead printing said first ink, wherein an increased temperature of said printhead printing said first ink increases a volume of said second fluid printed.

12. The method of claim 1 wherein said characteristic within said printer comprises an anticipated printing density of said first ink, reflecting a temperature of a printhead printing said first ink, wherein an increased printing density increases a volume of said second fluid printed.

13. The method of claim 1 wherein said characteristic within said printer comprises a printing frequency of said first ink.

14. The method of claim 1 wherein said characteristic within said printer comprises an accumulated operating life of a printhead printing said first ink.

15. The method of claim 1 wherein said characteristic within said printer comprises ambient humidity, wherein variations in humidity varies a volume of said second fluid printed.

16. The method of claim 1 wherein said characteristic within said printer comprises ambient temperature.

17. The method of claim 1 wherein said one or more printheads include at least a first printhead for printing cyan ink, a second printhead for printing black ink, a third printhead for printing magenta ink, and a fourth printhead for printing yellow ink.

18. The method of claim 17 wherein said one or more printheads further include a fifth printhead for printing a fixer fluid.

19. The method of claim 1 wherein said one or more printheads comprise one or more separate replaceable units.

20. The method of claim 1 wherein said volume of said second fluid is about 5 to 50 percent of a volume of said first ink.

21. The method of claim 1 wherein said steps a, b, and c cause a volume of said second fluid printed to have a substantially constant relationship to a volume of said first ink printed despite changing conditions within said printer that affect an ink drop volume of said first ink.

22. The method of claim 1 wherein a volume of said second fluid is adjusted by printing more or less dots of said second fluid for each first ink dot.

23. An apparatus in an inkjet printer comprising:
one or more printheads including a first set of nozzles for printing a first ink, and a second set of nozzles for printing a second fluid, said second fluid for interacting with said first ink on a medium;
a detector for detecting a characteristic within said printer; and
a controller for varying a volume of said second fluid printed based on said characteristic to achieve a desired volumetric relationship between said first ink and said second fluid.

24. The apparatus of claim 23 wherein said characteristic within said printer comprises a temperature of a printhead printing said first ink, wherein an increased temperature increases a volume of said second fluid printed.

25. The apparatus of claim 23 wherein said characteristic within said printer comprises an anticipated printing density of said first ink, reflecting a temperature of a printhead printing said first ink, wherein an increased printing density of said first ink increases a volume of said second fluid printed.

26. The apparatus of claim 23 wherein said characteristic within said printer comprises a printing frequency of said first ink.

27. The apparatus of claim 23 wherein said characteristic within said printer reflects an accumulated operating life of a printhead printing said first ink.

28. The apparatus of claim 23 wherein said characteristic within said printer comprises ambient humidity, wherein a lower humidity increases a volume of said second fluid printed.

29. The apparatus of claim 23 wherein said characteristic within said printer comprises ambient temperature.

* * * * *